(12) United States Patent
Da Silva (10) Patent No.: US 6,819,866 B2
(45) Date of Patent: Nov. 16, 2004

(54) WATERTIGHT UNIVERSAL HOUSING (75) Inventor: Robert J. Da Silva, Stanmore (AU)

(73) Assignee: Underwater Systems & Technology Pty Ltd., Stanmore (AU)

(*) Notice: Subject to any disclaimer, the term of this patent is extended or adjusted under 35 U.S.C. 154(b) by 0 days.

(21) Appl. No.: 10/469,761

(22) PCT Filed: Mar. 5, 2002

(86) PCT No.: PCT/AU02/00251
§ 371 (c)(1),
(2), (4) Date: Sep. 4, 2003

(87) PCT Pub. No.: WO02/071146
PCT Pub. Date: Sep. 12, 2002

(65) Prior Publication Data
US 2004/0076415 A1 Apr. 22, 2004

(30) Foreign Application Priority Data
Mar. 5, 2001 (AU) .............................................. PR3508
Sep. 26, 2001 (AU) .............................................. PR7936

(51) Int. Cl.[7] .............................................. G03B 17/08
(52) U.S. Cl. .............................. 396/27; 396/56; 348/81; 348/373
(58) Field of Search ................ 348/373, 81; 396/25, 396/27, 56–59

(56) References Cited

U.S. PATENT DOCUMENTS 5,281,988 A * 1/1994 Martin ......................... 396/59
5,305,030 A * 4/1994 Yokoyama et al. ............ 396/27
6,128,441 A * 10/2000 Kamata et al. ................ 396/25
6,400,903 B1 * 6/2002 Conoval ....................... 396/56
2004/0095506 A1 * 5/2004 Scott ........................... 348/373

FOREIGN PATENT DOCUMENTS

JP          07-287286        10/1995

* cited by examiner

Primary Examiner—David M. Gray
(74) Attorney, Agent, or Firm—Marshall, Gerstein & Borun LLP (57) ABSTRACT A watertight universal housing (1) which allows video cameras, or other electronic devices, to be operated underwater. The term "universal" is intended to indicate the housing's suitability for use with a range of different video cameras or other electronic devices. The watertight universal housing has a sealable internal cavity (3) which is adapted to receive a remotely controllable electronic device (4), a programmable controller (6): and an electromagnetic signal transmitter (5) in the housing which is controlled by the programmable controller. The programmable controller is designed to receive a command to control the remotely controllable electronic device from a command providing device (8). The controller then causes the electromagnetic signal transmitter to selectively transmit electromagnetic signals corresponding to that command to the remotely controllable electronic device.

23 Claims, 3 Drawing Sheets

WATERTIGHT UNIVERSAL HOUSING

TECHNICAL FIELD

The present invention relates to watertight universal housings, and, in particular, relates to a watertight universal housing which allows cameras, video cameras, or other electronic devices, to be operated under water. The term "universal" is intended to indicate the housing's suitability for use with a range of different cameras, video cameras or other electronic devices.

The invention has been developed primarily for use with video cameras and will be described herein with reference to this application. However, it will be appreciated that the invention is not limited to this particular field of use.

BACKGROUND ART

There are a number of watertight video camera housings on the market today, each having their own deficiencies. One of the most significant deficiencies of known housings is that they are not universal. That is, housings need to be either made specifically for one type of camera, or a small number of very similar cameras which operate upon the same set of commands. Such specifically designed housings tend to be very expensive and are difficult for consumers to obtain. At present, a person owning a particular video camera cannot just walk into a dive shop and buy a universal housing off the shelf which will enable his or her video camera to be used underwater.

The present invention, on the other hand, is directed to providing an underwater housing which may be used with a range of different video cameras (or other remotely controllable electronic devices). Such devices typically have built-in infrared ports and other remote signal receivers. The housing of the present invention includes a programmable controller which learns the particular infrared signals usually used to remotely control the device (typically a video camera) out of the water. By combining this programmable controller with an infrared transmitter, the watertight housing of the present invention acts as a universal housing which enables a range of different remotely controllable electronic devices to be used underwater.

DISCLOSURE OF INVENTION

In a first aspect, the present invention provides a watertight universal (as hereinbefore defined) housing comprising:

(a) a sealable internal cavity adapted to receive one of a number of different remotely controllable electronic devices which are operable by different sets of electomagnetic remote command signals;
(b) a programmable controller;
(c) operating means for conveying selected commands form a user to the programmable controller; and
(d) an electromagnetic signal transmitter in, on or about said housing which is controlled by the programmable controller;

wherein the programmable controller is adapted to:
  (i) receive two or more sets of remote command signals from command providing means, each set of remote command signals being adapted to control one of the remotely controllable electronic devices;
  (ii) store information concerning the remote command signals;
  (iii) identify a remotely controllable electronic device located in the housing; and
  (iv) upon receipt of selected commands from a user, cause the electromagnetic signal transmitter to transmit to the identified device the appropriate remote command signals, for the identified device, which correspond to the selected commands.

Generally, the remotely controllable electronic devices will be video cameras or other similar devices for capturing moving or still images.

Typically, the programmable controller is adapted to receive the sets of remote commands via one or more of:
  (a) an electromagnetic signal; or
  (b) an electronic signal In a second aspect, the present invention provides a watertight universal (as hereinbefore defined) housing comprising:

(a) a sealable internal cavity adapted to receive one of a number of different remotely controllable electronic devices which are operable by different sets of electromagnetic remote command signals;

(b) a programmed controller which stores a plurality of sets of remote command signals, each set of remote command signals being adapted to control one of the remotely controllable electronic devices;
(c) operating means for conveying selected commands from a user to the programmed controller; and
(d) an electromagnetic signal transmitter in, on or about said housing which is controlled by the programmed controller;

wherein the programmed controller is adapted to:
  (i) identifying a remotely controllable electronic device located in the housing; and
  (ii) upon receipt of selected commands from a user, cause the electomagnetic signal transmitter to transmit to the identified device, the appropriate remote command signals, for the identified device, which correspond to the selected commands.

As noted above, the electronic devices are typically video cameras or other similar devices for capturing movies or still images.

The programmable controller, or programmed controller, typically includes controller memory means for storing the information concerning the remote command signals and initiating means for prompting the electromagnetic signal transmitter to transmit the appropriate remote command signals.

It is preferred that the programmed controller is also adapted to be programmable so that it can receive and store additional sets of remote control signals which are adapted to control additional cameras (or other electronic devices). This feature enables the controller to be programmed so as to accommodate cameras (or other electronic devices) which come onto the market after the subject watertight housing has been manufactured (and programmed).

The location of the electromagnetic signal transmitter can be inside or outside of the cavity. If outside the cavity, the electromagnetic signal transmitter should be in visual communication with the cavity via a transparent window. Typically, the electromagnetic signal transmitter would be positioned so that when a selected video camera (or other electronic device) is located in the cavity, there will be a space for unobstructed signal communication between the electromagnetic signal transmitter and a corresponding receiver within the video camera (or electronic device). It may not be necessary for there to be a straight-line communication between the transmitter and the receiver as it would be possible to enable the desired signal to be transmitted from the transmitter to the receiver by flooding open spaces within the cavity with the signal (so that a signal of sufficient strength will still be received by the receiver).

The receiver on the camera will typically be a transparent window.

Alternatively, the electromagnetic signal transmitter may be adapted to transmit the appropriate remote command signals to the selected camera at least partially by a cable, such as a fibre optic cable.

Typically, the electromagnetic signal transmitter is connected to the programmable (or programmed) controller via an electrical signal carrier.

The operating means is adapted so as to enable a user to send selected commands to the programmable (or programmed) controller by means of operating signals. The operating means may include:

(a) operating buttons, located outside the cavity, by means of which a user may enter selected commands; and
(b) an electronic control module, adapted to detect any operation of the operating buttons and to send a corresponding operating signal to the programmable (or programmed) controller;

wherein the programmable (or programmed) controller is adapted then to transmit a corresponding remote command signal to the selected camera.

The buttons may be located on a watertight key pad. This watertight key pad may be in the form of a touch screen key pad situated in or on an outer wall of the housing, said touch screen key pad being adapted to receive user supplied key pad selections through the housing wall. The watertight key pad is generally connected to the electronic control module via an electrical signal carrier.

The appropriate remote command signals transmitted by the electromagnetic signal transmitter typically comprise one or more of infrared signals, microwave signals, radio signals. As noted above, each appropriate remote command signal may be transmitted to the camera by a direct beam or by flooding empty spaces within the cavity with the signal.

The housing preferably includes a visible screen adapted to show images captured by the camera within the cavity. Typically, this visible screen will be located at an end of the housing near the user. The screen is typically an LCD (liquid crystal display) screen.

This screen greatly improves the functionality and universality of the housing as it obviates any need to have any window or eyepiece in the housing which would need to be in alignment with the viewfinder or display screen of the camera. This screen makes the housing very easy and convenient to use as a user can observe the screen from an arms-length distance and not have to have the housing close to his or her eyes. This also make use of the housing safer, since the user's peripheral vision is not restricted.

The housing preferably also includes a switchable power supply which provides power to one or more of:

(a) the electronic device;
(b) the operating means;
(c) the electromagnetic signal transmitter;
(d) the programmable (or programmed) controller; and
(e) the screen The switchable power supply is preferably a single power circuit board (PCB).

The command providing means may comprise one or more of:

(a) one or more remote control units associated with the remotely controllable electronic device;
(b) one or more computers;
(c) one or more signal purpose command providing devices; or
(d) one or more reading devices adapted to read digital information storage media.

The command providing means may comprise:

(a) memory means adapted to receive and store a plurality of sets of remote command signals, each set of command signals corresponding to one of the different remotely controllable electronic devices; and
(b) transmitting means adapted to transmit one or more of the sets of remote command signals to the programmable controller of the watertight universal housing.

Preferably, the memory means is adapted to receive and store additional sets of remote command signals corresponding to additional models of remotely controllable electronic devices.

When the command providing means is a computer, it may take the form of a client computer linked via a network to a server computer, the client computer being adapted to receive and store a plurality of sets of commands from the server computer.

When the command providing means is a single purpose command providing device it will typically be a remote control unit associated with a particular camera (or other electronic device).

The identification of the electronic device within the cavity may be affected either electronically or by receipt of an identification message input by the user.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

BRIEF DESCRIPTION OF THE DRAWINGS

Preferred embodiments of the present invention will now be described, by way of example only, with reference to the accompanying drawings in which.

DETAILED DESCRIPTION

Figure 1:
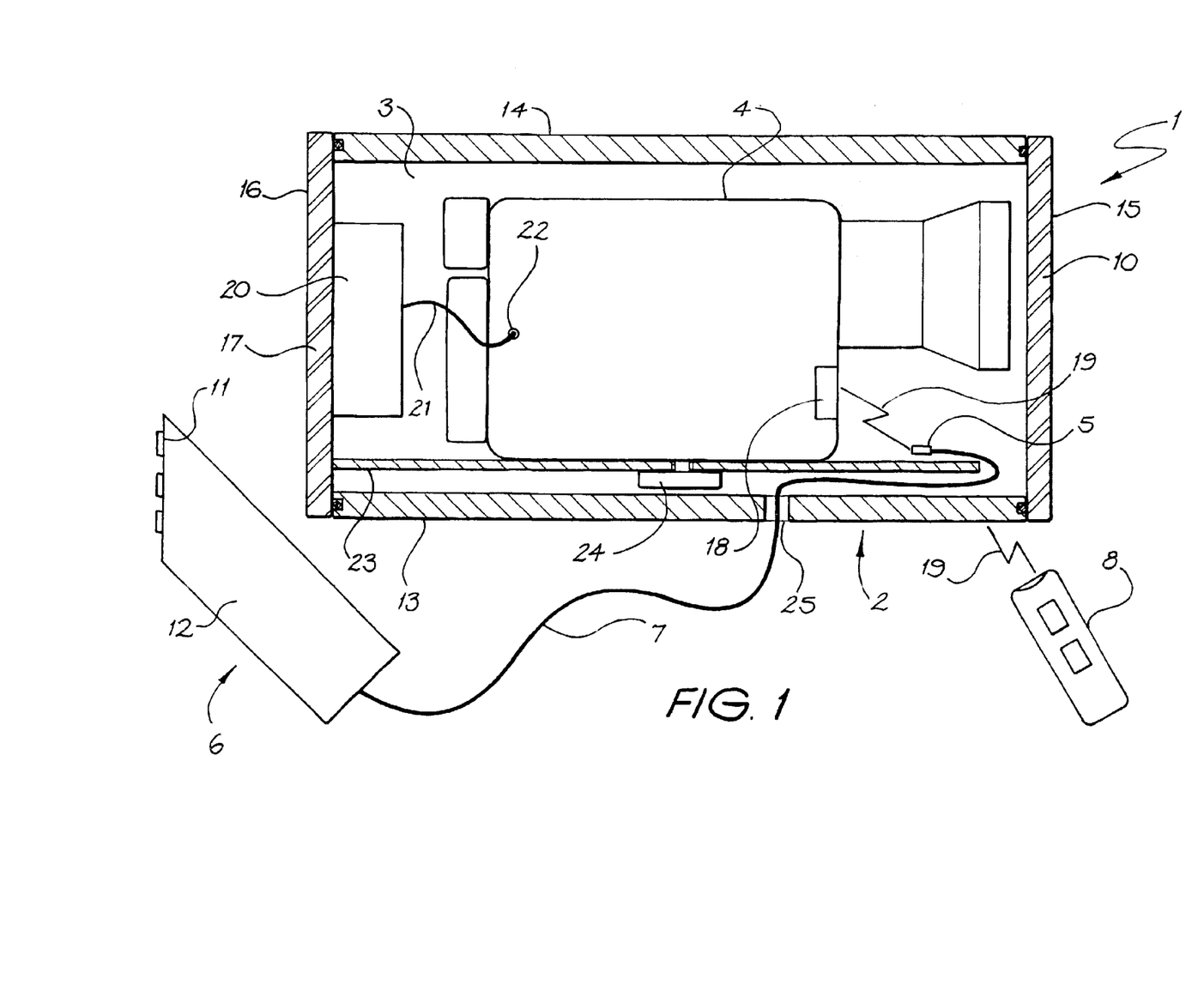
FIG. 1 is a sectional side view of a housing according to a first preferred embodiment.
Figure 2:
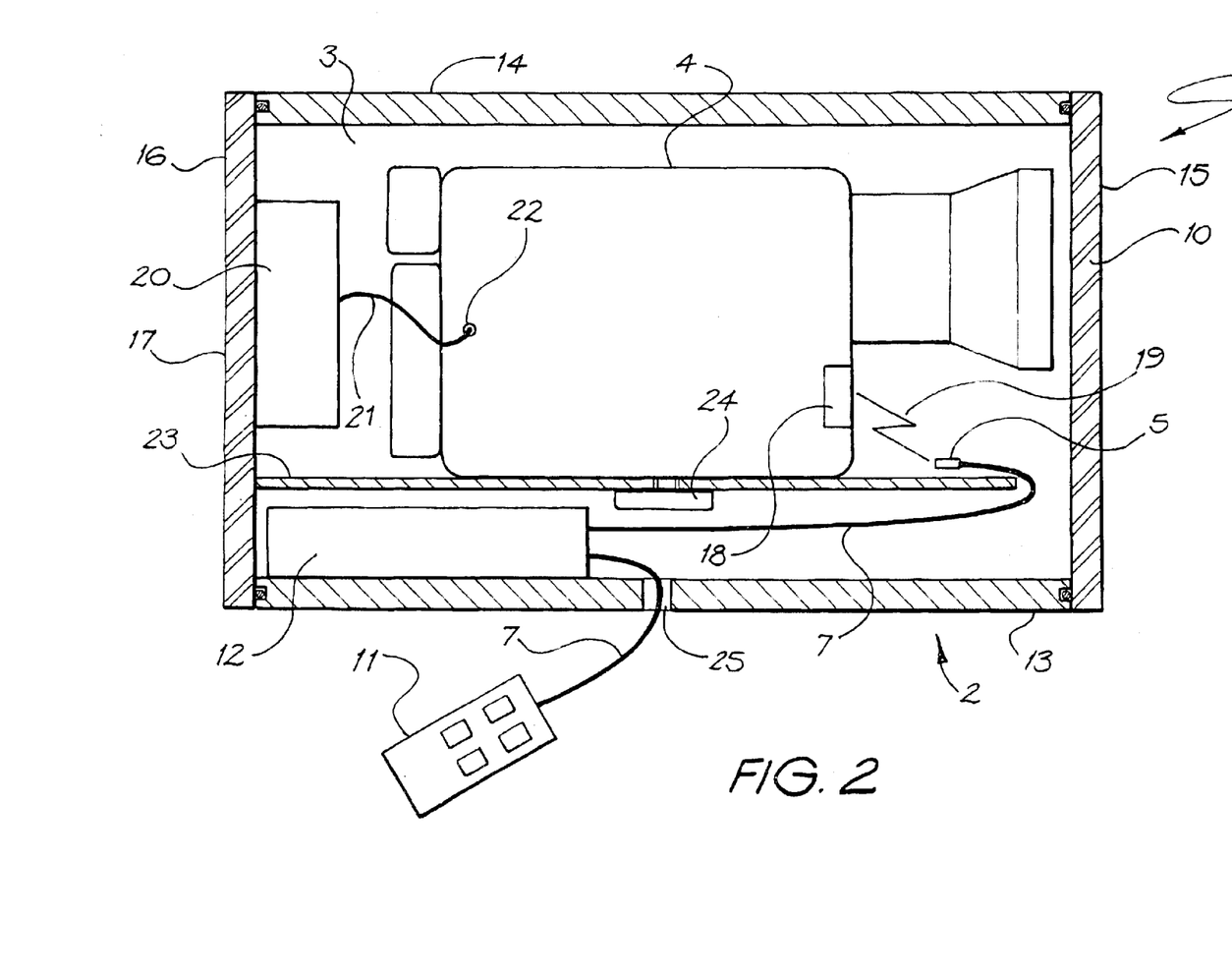
FIG. 2 is a sectional side view of a housing according to a second preferred embodiment.

Referring to FIG. 1, the first preferred embodiment of the watertight universal housing 1 comprises a body 2 having an internal cavity 3 which is adapted to receive a remotely controllable electronic device 4. The electronic device 4 shown in FIGS. 1 and 2 is a camera or video camera. The housing has an electromagnetic signal transmitter 5 which is connected to a programmable controller 6 via an electrical signal carrier 7. In this embodiment, the body 2 has a base 13 and a top 14 joined by left and right sides and is made of a material suitably resistant to underwater pressures, such as stainless steel, polyurethane, aluminium, high impact plastic and the like.

The body also has a front end 15 and a back end 16. Although the housing of the present invention may be used with any remotely controllable electronic device, the housing of the first preferred embodiment is designed to hold a video camera. In this embodiment, the front end 15 of the body 2 has a transparent window 10 which provides visual access to the cavity 3 and allows the camera 4 to record underwater images. The back end 16 of the body 2 includes a door 17 which provides physical access to the cavity 3. The door may be opened in order to insert or remove the camera from the cavity and may be closed in a watertight manner, thereby protecting the camera from being damaged when the housing is submerged. Alternative positions of doors and windows are also envisaged.

Although the video camera is not part of the present invention, it is clear from FIG. 1 that the video camera has a remote signal receiver 18 situated at its front end. In this embodiment the electromagnetic signal transmitter 5 transmits infrared signals 19 to the signal receiver 18 in order to control the camera 4. In alternative embodiments, the transmitter could also transmit bluetooth signals, microwave signals, radio signals, ultrasonic signals, or any other signals used to control remotely controllable electronic devices.

In this embodiment, the transmitter 5 is situated inside the cavity. However, the transmitter could be situated on the outside of the housing, provided that it is in visual communication with the cavity 3 via the window 10. This is so that the infrared signals can pass through the window 10 to control the video camera 4 or other remotely controllable electronic device. Alternatively, the transmitter could be situated inside or outside the cavity and transmit the infrared signals to the camera via a fibre optic cable. In this example, the distal end of the cable would point towards the camera's receiver 18 to allow the infrared signals to be successfully received.

The video camera 4 also has a remote control unit 8, provided by its manufacturer, which may be used to control the video camera when it is not underwater. The remote control unit 8 emits particular commands in the form of remote signals 19. The programmable controller 6 is designed so that it is able to receive and store those commands from the remote control unit 8. This learning ability is similar to that found in "Smart" remote controls such as the Digitor "Fox" four-in-one remote. That device is a single remote control unit which operates four different electronic devices, such as televisions, stereos and the like: In this invention, once the programmable controller 6 has received and stored the commands provided by the remote control unit 8, it can then cause the electromagnetic signal transmitter 5 in the housing to selectively transmit electromagnetic signals corresponding to those particular commands to the video camera 4, inside the housing.

In this way, by learning the set of commands which relate to a particular video camera 4, the housing may be programmed to control a range of video cameras, or other remotely controllable electronic device. For example, a variety of video or still cameras which have an infrared receiver 18 can be used underwater using this watertight universal housing.

In another embodiment of the invention, the programmable controller does not receive the particular remote signals 19 from the remote control unit 8, but instead receives and stores a set of commands from another type of command providing device such as a computer. The set of commands includes all of the information needed to remotely control the video camera 4. The electromagnetic signal transmitter then controls the video camera by transmitting electromagnetic signals corresponding to the camera's set of commands. In this way, the programmable controller is able to store the sets of commands for a wide variety of models of video camera.

In an alternative embodiment the programmable controller takes the form of a programmed controller which (perhaps during the manufacturing process) stores a number of command sets corresponding to a number of different camera models. When a user wishes to use the housing, he or she selects the camera model and the programmed controller accesses the corresponding stored command set. It can then use the selected command set to cause the transmitter to control the video camera by transmitting electromagnetic signals corresponding to the selected set of commands. In this way, the programmable controller is able to store the sets of commands for a wide variety of models of video camera. In the preferred embodiment, the programmable controller not only has a set of pre-programmed command sets, but also has capacity (eg sufficient memory) so that it can learn new command sets from a command providing device. In this way, the programmed controller is also a programmable controller.

In one form, the programmable controller may be connected to a command providing device which may be situated inside the housing or may be remote from the housing.

When the command providing device is inside the housing, it may take the form of a digital information media reading device (such as a disk drive, Memory Stick™ reader or the like) adapted to receive digital information storage media which are adapted to store command sets. The storage media typically include removable storage media, such as Memory Stick™ devices and the like. The programmable controller is adapted to access these command sets in the digital information storage media. In this way, when new camera models come onto the market, the housing may be updated to cater for these new models by receiving a new item of digital information storage media, with the new command sets stored in it. Alternative forms of replaceable digital information storage media are envisaged in addition to Memory Stick™ devices.

When the command providing device is remote from the housing it may take on many forms but is capable of storing a number of sets of commands corresponding to a variety of brands and models of video cameras (and still cameras). It is also adapted to upload those new command sets to the housing. Because new cameras come onto the market all the time, in order to be able to be used with these new cameras, both the programmable controller and the command providing device are able to receive and store (and, subsequently, to transmit) new sets of commands for those new cameras.

The programmable controller may receive the sets of commands from the command providing device in a number of ways including via a serial cable, a parallel cable, via an electromagnetic signal (eg an IR signal), via an electronic signal or the like.

The command providing device typically has a memory and a transmitting interface. The memory stores all of the different sets of commands for the different camera models. The transmitting interface may take on a number of forms, but is designed to transmit those sets of commands to the programmable controller of the watertight universal housing.

As mentioned earlier, the command providing device needs to be updatable to include new command sets for new video cameras. It may have an updating interface which facilitates the addition of new command sets. Those command sets may be loaded into the command providing device in a number of ways, including receiving the data directly from the manufacturer, using a learning remote to receive and learn the signals from the camera's remote control unit, and the like.

The command providing device may take on a number of forms. In one form it is a client computer linked via a network to a server computer. In this version, the client computer receives the latest sets of commands from the server computer and stores them in its memory. It then transmits the new sets of commands to the programmable controller 6 in the housing 1. In this version, the system administrator only needs to load the new sets of commands onto the server computer, perhaps via the internet. The operators of the client computers can then download the latest sets of commands via the internet and update their universal housings. In this way, the housing is able to be used to house the latest camera models.

Instead of using a client computer, the command providing device could take the form of a single purpose command providing device whose only purpose is to store the sets of commands and provide them to the programmable controller on the housing. New sets of commands could be provided to the single purpose device via a link to the internet. Alternatively, the single purpose device could be occasionally returned to the manufacturer for updating with the latest sets of commands and then returned to the end user. This embodiment may be useful for companies such as dive shops which may rent out the housings to their customers. The customers will have a wide variety of cameras and the housing needs to work with as many different models as possible. By using the command providing device to update the information in the programmable controller of the housing, the housing is able to stay up to date.

In the first embodiment shown in FIG. 1, the programmable controller 6 comprises a watertight keypad 11 and an electronic control module 12, both of which form two parts of a single unit and which are situated outside the body 2. However, in the second preferred embodiment shown in FIG. 2, the electronic control module 12 is separate from the watertight keypad 11 and is situated inside the body 2, whilst the keypad 11 is situated outside the body. In this second embodiment, the keypad 11 is connected to the electronic control module 12 via an electrical signal carrier 7. The electrical signal carriers in each of the two embodiments will typically be an insulated cable or wire, as is known in the art.

In an alternative embodiment, the watertight keypad takes the form of a touch screen keypad situated in a wall of the housing. In this form, the touch screen keypad is adapted to be used through the housing wall. In one embodiment, the touch screen sits within the back wall 16 of the housing, underneath the LCD screen. The glass in the back wall forms the interface between the user and the touch screen keypad, allowing the user to control the camera. In this form it will be appreciated that the housing is even more watertight since the electrical signal carrier which joins the keypad to the electrical signal controller no longer needs to pass through a hole in a wall of the housing (as it does in the examples of FIGS. 1 and 2).

The inventor has found that many remotely controllable electronic devices, such as video cameras, will automatically switch themselves off if they have not been used for a certain period of time. This causes problems when the device is in an underwater housing because the user must return to the surface in order to switch the camera back on.

The preferred embodiments of the present invention therefore include a switchable or interruptable voltage power supply for the electronic device. The power supply provides power to the electronic device, the LCD screen, the electronic control module, the keypad and the like. In order to save space, a single power circuit board (PCB) is provided which regulates the power supplied to each of these elements. The preferred embodiment of the PCB may not only be switched on and off but may also provide selectable voltages, since different camera models often run on different voltages.

Figure 3:
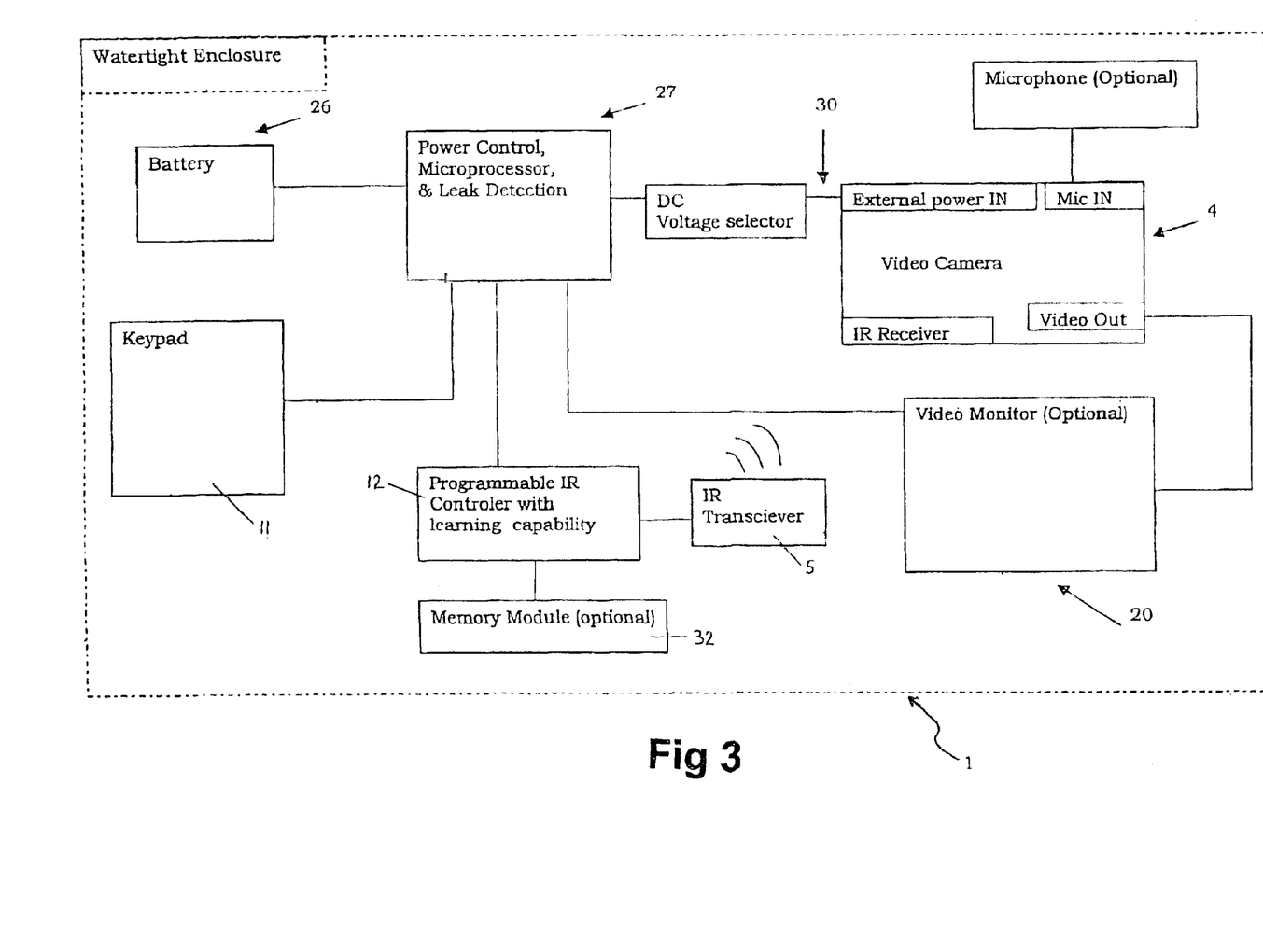
FIG. 3 is a conceptual block diagram illustrating the connections between each of the components of the housing.

FIG. 3 shows a conceptual block diagram illustrating the connections between each of the components of the housing in a preferred embodiment. As seen in that figure, the housing 1 has a battery 26 which is designed to have sufficient power not only to run the components of the housing, but also to provide power to the camera 4. The battery is connected to a power circuit board (PCB) 27 which is designed to control the power supply to the other components of the housing and the camera. The PCB is connected to a screen 20 (in the embodiment which incorporates a screen) which receives video input via a video cable 28 connected to a video-out port 29 on the camera 4.

The PCB supplies power to the camera 4 via a power cord 30 which connects to a power-in port 31 on the camera 4. Because many cameras have specially designed power-in ports, they also have correspondingly designed power cords which are supplied by the manufacturer. Because of this, the power cord 30 may take the form of a connecting cord connected to the manufacturer supplied cord via an in-line plug. In use, the power runs from the PCB 27, through the connecting cord into the manufacturer supplied cord via the in-line plug, through to the power-in port 31 of the camera. For those cameras which have fairly standard power-in ports, a set of prefabricated cables may be supplied which are designed to provide power from the PCB 27 to the camera 4.

The PCB 27 also supplies power to the programmable controller 12 which, in turn provides power to the keypad 11, the electromagnetic signal transmitter 5 and the programmable memory module 32 to which it is connected. This memory module is designed to store the command sets for the different models of video camera. The module may include a reader which is adapted to receive and read digital information storage media (such as Memory Sticks™) which store updated command sets. When such updating storage media are loaded into the reader, the programmable controller can then access the updated command sets in the memory module to enable the housing to be used with the latest camera models.

In one embodiment, the programmable controller may have a direct connection to the battery so that it is constantly supplied with power.

As noted above, the housing may include a mini LCD screen 20 at the back end 16 of the housing 2 which is connected via a lead 21 to the video output 22 of the video camera. This allows video signals to be clearly shown to the viewer on the mini LCD screen. It also avoids any limitation on a user's peripheral vision. In alternative embodiments, the back end 16 of the housing may be fitted with a transparent window similar to that at the front end 15 of the housing, to allow the user to directly see the images being recorded by the video camera 4 through the camera's viewfinder or LCD screen.

It will be appreciated by those skilled in the art that the watertight universal housing of the present invention will have a number of fairly standard features, some of which are described below.

The video camera may be mounted to a floor plate 23 by a tripod mount screw 24. The transparent window 10 may be flat or optically corrective for use underwater. The electronic circuitry in the keypad 11 and/or the electronic control module 12 may include leak detection functions. The body 2 of the housing itself may also be fitted with leak detection functions and an alarm to indicate that water has seeped into the cavity 3. The electromagnetic signal transmitter 5 may be mounted on a flying lead within the cavity 3 so that it may be positioned in an optimum position relative to the remote signal receiver 18 on the video camera 4. Fibre optics may be used to transmit and direct the electromagnetic signals 19 towards the device's receiver 18. The electronic printed circuit board in the programmable controller 6 may be sealed in a potting compound to enhance its water protection. Such potting compound may also be used to enhance the watertightness of the seal 25 which the electrical signal carrier 7 passes through. This seal may also take the form of a watertight plug or a cable feed through, both of which are commercially available.

Preferably, the housing is designed to have no protrusions or sharp corners or edges. All materials chosen for the manufacture of the housing are preferably adapted to inhibit any corrosion or degradation from exposure to air, water or salt.

For instance stainless steel, aluminium, fibreglass, carbon fibre and certain plastics may be suitable materials.

To allow for cameras of different shapes and sizes, it is desirable that the base of the housing cavity be slotted. This will enable adjustment of the camera mounting point. Typically the camera will be secured to the tray via the camera's tripod mount screw.

Typically, the electronics of the housing are located within an electronics bay which is designed to secure the electronics PCB and LCD monitor with a shockproof mounting. This protects the internal electronics against damage from knocks and falls.

Preferably, the housing will be pressure sealed and tested to a depth of at least 75 m. The housing may also include bouancy adjusting means, such as a separate chamber which can selectively be filled with, or emptied of, water.

Buoyancy of the empty housing should be positive so as to allow for a maximum internal camera pay load of about 1 kilogram. A variable buoyancy system is preferably incorporated into the design to allow easy adjustment of buoyancy which will depend upon the type of camera being used and its mass. The variable buoyancy system should be designed with a negative buoyancy failsafe so that the camera housing does not become positive even under failure conditions. If the variable buoyancy system incorporates a buoyancy system which incorporates a buoyancy cavity, this must be physically separated from the cavity which houses the camera and the electronic circuitry. This is so that, if any failure of the buoyancy system occurs, the housing for the camera and the electronics circuitry is not flooded.

Ideally, the housing also incorporates an external sun shade for the LCD monitor.

It is also desirable that the bottom of the housing includes a female tripod mount which can then be used for connecting to a tripod.

The outside of the housing may also have aqua phones suitably located in order to capture stereo sound. These aqua phones would need to be connected to the electronics circuitry via a suitable electrical feed.

Latches for opening and closing the housing should be adapted for ease of use and effective closure of the housing. Preferably, the housing will include a secondary safety catch or interlock that will prevent the latches from accidentally springing open. Preferably the housing will also include tamper-proof means to inhibit the housing being inadvertently opened.

The optical ports of the housing are preferably optically neutral. Pyrex type glass or certain polycarbonates are suitable for this purpose. Pyrex type glass is generally preferred owing to its scratch resistant nature.

The electronics circuitry typically incorporates a regulated switch mode power supply. The power supply should be fused, and fully protected against overload and short circuit. The main processor should be capable of monitoring the outward power from the power supply. This information can be used to detect automatically if the camera is in normal operating mode or in power saving mode. Furthermore, the CPU should be adapted to provide varying voltage which can be selected or varied depending upon the power requirements of the electronic device. The voltage can be varied either mechanically, such as by a rotary type selector switch, or electronically, such as by use of a suitable programmed software set-up menu, The CPU should be capable of switching the outward voltage to the camera depending on the camera model selected in the user software set up menu.

Preferably the electronics micro processor software is updateable by either DAT Chip Exchange or PC serial interface.

Preferably the LCD monitor should be at least 3 inches in size and be back-lit to a minimum brightness of 250 cd/m$^2$. It should be PAL/NTSC auto switching with 2 standard composite inputs of 1 v (pp) 75 ohms. One video input may be reserved for the camera output, while the other video input is used by the housing for user set up via the OSD (on screen display) programming. In order to conserve power, the LCD monitor should be adapted to be switched off (automatically) whenever the camera is senses in power saving mode.

Preferably, the housing software set-up is menu driven and displayed on the LCD monitor using a screen display.

Typically about 8 digital users inputs are connected as the user buttons.

The electronics preferably incorporates an electronic locking mechanism that will prevent accidental inputs from operating the device. This locking should have a visible indicator such as a multicoloured LED that will go from green to red when the input is locked.

A separate PCB is typically mounted on the camera tray. This PCB may connect to the permanently electronics inside the housing via a suitable edge connector.

The camera tray PCB typically serves as a martialling station for all the electrical connections to the camera and, typically, contains the following:

A flying lead terminated with a 3.5 mm stereo microphone plug. Colour coded red, labelled as 'Mic' the length of the lead should be chosen so it can register anywhere in the camera bay (but no longer).

Solidly mounted female RCA terminal. Colour coded yellow. Labelled 'video A/V'.

Solidly mounted 2.5 mm female DC power terminal. Colour coded black. Labelled 'DC power'.

One user exchangeable power fuse.

One IR transmitter placed towards the front of the camera tray and aimed towards the rear of the camera bay.

One IR transciever aimed forward to see through the front port.

All electrical contacts are preferably gold plated for corrosion existence. The PCB's should be coated with a protective lacquer, again in order inhibit corrosion.

All of the relevant camera settings, such as DC voltage, start up time delay OSD on boot, snooze power etc should be stored in a table of camera models. This listing of camera models should be programmed so that the appropriate camera model can be selected from a text menu on the screen.

Preferably, the user will be able to change the mapping of certain buttons to correspond to the desired IR commands for the user's camera.

Camera power settings, such as DC voltage, snooze power etc may be password protected for factory service only.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A watertight universal housing comprising:
    (a) a sealable internal cavity adapted to receive one of a number of different remotely controllable electronic devices which are operable by different sets of electomagnetic remote command signals;
    (b) a programmable controller;
    (c) operating means for conveying selected commands from a user to the programmable controller;
    (d) an electromagnetic signal transmitter in, on or about said housing which is controlled by the programmable controller;
    wherein the programmable controller is adapted to:
    (i) receive two or more sets of remote command signals from command providing means, each set of remote command signals being adapted to control one of the remotely controllable electronic devices;
    (ii) store information concerning the remote command signals;
    (iii) identify a remotely controllable electronic device located in the housing; and
    (iv) upon receipt of selected commands from a user, cause the electromagnetic signal transmitter to transmit to the identified device the appropriate remote command signals, for the identified device, which correspond to the selected commands.

2. A housing according to claim 1 wherein the programmable controller is adapted to receive the sets of remote commands via one or more of:
    (a) an electromagnetic signal; or
    (b) an electronic signal.

3. A watertight universal housing comprising:
    (a) a sealable internal cavity adapted to receive one of a number of different remotely controllable electronic devices which are operable by different sets of electromagnetic remote command signals;
    (b) a programmable controller which stores a plurality of sets of remote command signals, each set of remote command signals being adapted to control one of the remotely controllable electronic devices;
    (c) operating means for conveying selected commands from a user to the programmable controller;
    (d) an electromagnetic signal transmitter in, on or about said housing which is controlled by the programmable controller;
    wherein the programmable controller is adapted to:
    (i) identify a remotely controllable electronic device in the housing; and
    (ii) upon receipt of selected commands from a user, cause the electromagnetic signal transmitter to transmit to the identified device, the appropriate remote command signals, for the identified device, which correspond to the selected commands.

4. A housing according to claim 3, wherein the remotely controllable electronic devices are cameras, including video cameras, movie cameras and still-image cameras.

5. A housing according to claim 3, wherein the programmed controller is also adapted to be programmable so as to receive and store additional sets of remote command signals from command providing means, said sets of remote command signals being adapted to control one of a number of additional remotely controllable electronic devices.

6. A housing according to claim 3, wherein the controller includes:
    controller memory means for storing the information concerning the remote signals; and
    signal initiating means for prompting the electromagnetic signal transmitter to transmit the appropriate remote command signals.

7. A housing according to claim 3 wherein the electromagnetic signal transmitter is situated inside the cavity.

8. A housing according to claim 3 wherein the electromagnetic signal transmitter is located outside the cavity and is adapted to transit the appropriate remote command signals to the selected camera via a transparent window on the camera.

9. A housing according to claim 3 wherein the electromagnetic signal transmitter is adapted to transmit the appropriate remote command signals to the selected camera at least partially via a cable, such as a fibre optic cable.

10. A housing according to claim 3 wherein the electromagnetic signal transmitter is connected to the controller via an electrical signal carrier.

11. A housing according to claim 3 wherein the operating means is adapted to enable a user to send selected commands to the controller by means of operating signals.

12. A housing according to claim 11 wherein the operating means includes:
    (a) operating buttons, located outside the cavity, by means of which a user may enter selected commands; and
    (b) an electronic control module, adapted to detect any operation of the buttons and to send a corresponding operating signal to the controller;
    wherein the controller is adapted, upon receiving said operating signal, to transmit a corresponding remote command signal to the selected camera.

13. A housing according to claim 12, wherein the buttons are located on a watertight keypad.

14. A housing according to claim 13 wherein the watertight keypad is in the form of a touch screen keypad situated on an outer wall of the housing, said touch screen keypad being adapted to receive user supplied keypad selections through the housing wall.

15. A housing according to claims 13, wherein the watertight keypad is connected to the electronic control module via an electrical signal carrier.

16. A housing according to claim 3 wherein the appropriate remote command signals transmitted by the electromagnetic signal transmitter comprise at least one of:

(a) infrared signals;

(b) microwave signals; and (c) radio signals.

17. A housing according to claim 16 wherein each appropriate remote command signal is transmitted by a direct beam or by flooding empty spaces within the cavity with the signal.

18. A housing according to claim 3 further comprising a visible screen adapted to show images captured by the camera with the cavity.

19. A housing according to claim 18 wherein the screen is an LCD screen.

20. A housing according to claim 3 further comprising a switchable power supply.

21. A housing according to claim 20 wherein the switchable power supply provides power to at least one of:

(a) the electronic devices;

(b) the operating means;

(c) the electromagnetic signal transmitter;

(d) the controller; and (e) the screen.

22. A housing according to claim 20 wherein the switchable power supply includes a single power circuit board (PCB).

23. A housing according to claim 3 wherein the identification of the electronic device with in the cavity is effected either electronically or by receipt of an identification message input by the user.

* * * * *